Figure 1:
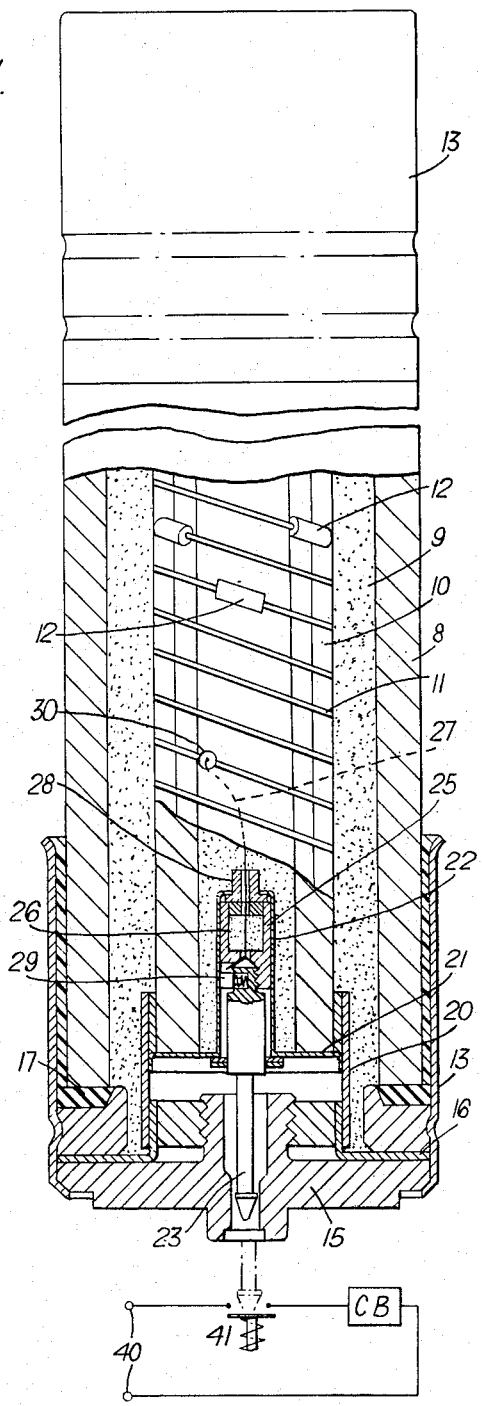

July 26, 1966  B. C. HICKS  3,263,048
TRIP DEVICES FOR ELECTRIC FUSES
Filed July 8, 1964  3 Sheets-Sheet 2

Inventor
Bruce C. Hicks
By Watson, Cole, Grindle & Watson
Attorneys

July 26, 1966  B. C. HICKS  3,263,048
TRIP DEVICES FOR ELECTRIC FUSES
Filed July 8, 1964  3 Sheets-Sheet 3
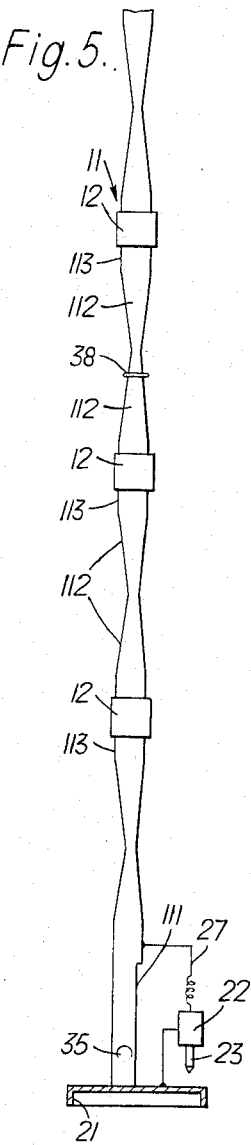
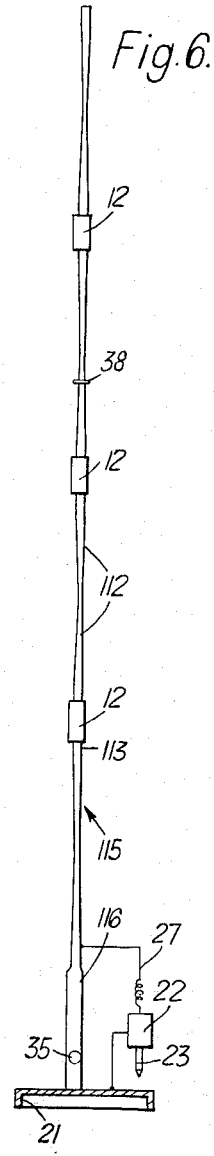
Inventor
Bruce C. Hicks
By Watson, Cole, Grindle & Watson
Attorneys

United States Patent Office 3,263,048
Patented July 26, 1966

3,263,048
TRIP DEVICES FOR ELECTRIC FUSES
Bruce Clifford Hicks, Caringbah, New South Wales,
Australia, assignor to E.M.P. Electric Limited
Filed July 8, 1964, Ser. No. 381,123
Claims priority, application Great Britain, July 10, 1963,
27,293/63
4 Claims. (Cl. 200—120)

The present invention relates to electric fuses having a trip device and particularly a high voltage current limiting fuse, the trip device being intended to operate an isolating switch or an indicator device.

High voltage powder filled fuses such as are in common use today are capable of operating satisfactorily with a current limiting action under short-circuit and similar fault conditions, but for overcurrent fault conditions they may operate with a delay factor, and there is a range of relatively small overcurrent values where such fuses do not operate at all or do not provide proper circuit interruption, that is to say there may be a gap between the minimum current which a fuse will clear satisfactorily (the "minimum interruption current" which may be about 4 to 5 times the full load rating) and the "minimum fusing current" (which may be about 1.8 to 2.4 times the full load rating); to provide proper circuit protection over this current range it has been necessary heretofore to provide overcurrent relay protection.

Various attempts have been made to reduce both the minimum fusing current and the minimum interruption current of the fuse but there is inevitably a range of low overcurrent values over which circuit interruption is not obtained by means of a fuse.

A fuse carrying an overload current between the full load rating and the minimum fusing current for a prolonged time may result in overheating of the fuse and may damage the fuse structure or associated components, for example the internal or external contact springs may be damaged by heat and their springiness may be lost, resulting in arcing at the contacts with the liability to further heating of the fuse mounting.

The object of the present invention is to provide means for ensuring circuit protection by high voltage current-limiting power fuses over the range between the full load current rating and the minimum fusing current or between the full load current and the minimum interruption current, thereby avoiding the need for overcurrent relay protection devices to isolate the circuit under these fault conditions; and more specifically to provide fuses which give protection over this range.

The full load rating of a fuse is the maximum current which the fuse is designed to carry continuously without deterioration. A high voltage fuse will comprise two or more current carrying fusible elements, generally of silver, mounted within a quartz-filled container, and these elements may develop a surface temperature of up to 200° C. For overcurrent faults the fusible elements become heated to a still higher temperature with the danger of deterioration if the fault current continues for an extended period.

In its broadest aspect the present invention comprises a powder-filled fuse structure using, in addition to the components usual in high voltage powder-filled fuses, a trip device containing a charge of gas-producing material adapted to be activated by an actuating wire and connected across a short portion of one only of the fusible elements, adjacent one end cap of the fuse structure, and said portion is arranged or modified in such manner as to ensure that this portion is melted under low overcurrent fault conditions to cause diversion of the current and effect activation of the said charge, thereby to displace a striker pin which is adapted to perform some auxiliary function such as to operate an isolating switch or to actuate a visual or audible warning indicator either at a point adjacent to the fuse or through a remote control circuit at some remote point to warn an operator to take appropriate action.

Thereby complete protection of a supply circuit may be obtained by means of a fuse under all fault conditions, avoiding the need for overcurrent fault relays or like control devices which have been necessary heretofore to ensure protection under low overcurrent fault conditions.

Trip devices of the character utilized in the present invention have already been proposed for other purposes in U.S. Patent No. 2,800,554, such devices comprising a shunt element connected across a part of a main fusible element or elements, which is adapted under heavy fault conditions to carry momentarily a proportion of the fault current and thereby to become heated so as to actuate a trip device, indicator or the like. Since the shunt element will normally be connected across only a small portion of the main fusible element near one end cap of the fuse, said shunt element will carry substantially no current under normal working conditions, whereas under heavy fault conditions sufficient current is diverted into the shunt circuit to ensure the operation of the trip device, which may be brought into action by activating a gas-producing means or a small charge of explosive material.

No provision was made to give protection for low overcurrent fault conditions but only to provide for operation of the trip device under the same fault conditions that cause the fuse to interrupt the fault current with a current-limiting action. The present invention is particularly directed to the provision of an electric fuse including a trip device of the character referred to in which operation of the trip device is obtained under low overcurrent fault conditions and without substantially affecting the correct operation of the fuse under short-circuit fault conditions or fault conditions involving greater values of overcurrent than specified above.

The present invention is more particularly directed to a current limiting high voltage fuse embodying a trip device of the character referred to above which is arranged to be operative at overcurrent values between the full load current and the minimum fusing current or between the full load current and the minimum interruption current, as explained above, and to secure reliable operation of a trip or striker device so as to provide an audible or visual warning that the fuse has operated in response to an overcurrent fault, or alternately to operate an isolating switch which ensures isolation of the protected circuit from the supply.

In accordance with the present invention an electric fuse comprises an outer casing housing a powder filling and a plurality of fusible elements extending between terminal caps on said casing; a trip device associated with one of said terminal caps including a charge of gas-producing material, an actuating wire in physical contact with said powder filling and a striker pin adapted to be projected to the outside of said casing on activation of said gas-producing charge, means connecting said actuating wire electrically to a point of one said fusible element disposed close to said terminal cap, and the arrangement of the portion of the length of said one fusible element between said point and said terminal cap being such as to divert current into said actuating wire to cause said powder filling to actuate said striker pin.

The means to ensure diversion of the current may comprise a restriction in the cross-sectional area of the said one fusible element between the point of connection of the actuating wire and the adjacent terminal cap. Such restriction may be obtained in various ways and may include a portion or bead of low melting point metal adjacent to the restriction. The low melting point metal may consist of any metal or alloy which forms a eutectic with the metal of the fusible element, which will normally consist of silver, or may also consist of copper. Suitable metals for said portion or bead are for example tin, cadmium, zinc, lead or alloys thereof.

Conveniently the said restriction is obtained by providing an aperture in the one fusible element where this is in the form of a strip or in a flattened end part of the fusible element where the latter consists of a wire, and said aperture may serve to receive a rivet formed of one of said low melting point metals clenched into intimate contact with the flat surfaces of the fusible element. This arrangement ensures an intimate contact between the low melting point metal and the fusible element and avoids oxidation occurring at the contact surfaces.

A restriction of the character referred to may function in conjunction with other means which promote effective diversion of the current into the actuating wire under low overcurrent fault conditions. Such additional means may comprise a restriction of the whole of the cross-section of the fusible element between the said point and the said terminal cap and/or it may comprise a further aperture in the fusible element preferably at a point more remote from the terminal cap than the position occupied by the low melting point metal.

The function of the low melting point material is that it alloys with the material of the fusible element as a consequence of the heating of the fusible element under overcurrent fault conditions, and the resulting alloying provides a zone in which melting of the so alloyed portion occurs and consequently diversion of the fault current through the trip device.

Figure 2:
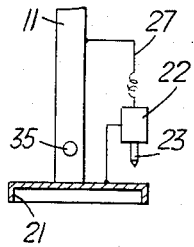
Figure 3:
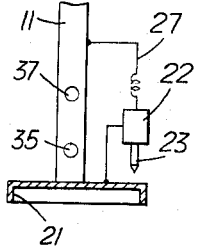
Figure 4:
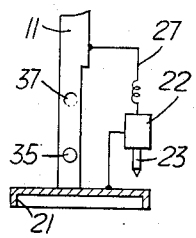
Figure 7:
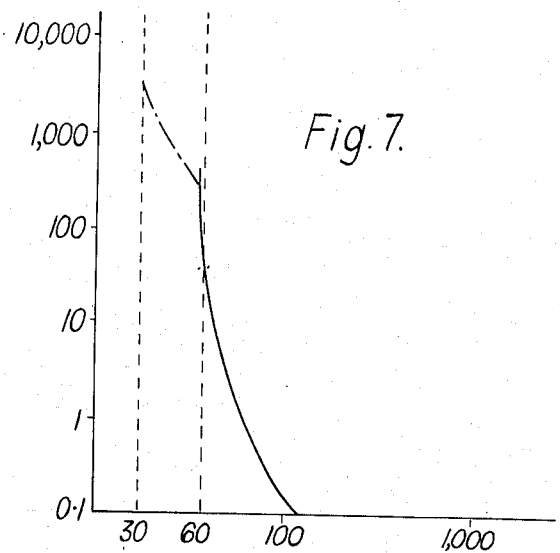

The features of the present invention are illustrated by way of example on the accompanying drawings in which:

FIG. 1 illustrates a high voltage current-limiting fuse incorporating a trip device, FIGS. 2, 3 and 4 are diagrammatic explanatory views illustrating various ways in which the trip device is connected to one section of a fusible element, FIGS. 5 and 6 are diagrammatic views showing typical examples of fusible elements, combined with trip devices and suitable for use in conjunction with the fuse structures shown in FIG. 1, and FIG. 7 illustrates a graph showing the operating properties of a typical fuse constructed according to the present invention.

FIG. 1 shows a typical fuse structure to which the features of the present invention can be applied. A ceramic or other suitable outer casing 8 encloses a powder filling 9 surrounding and within a ceramic hollow star-shaped core 10 on to which two or more fusible elements 11 are wound in helical manner. If desired, the fusible elements may be provided in well-known manner with ceramic beads 12 at spaced points, which serve to control the arc under fault clearance conditions to ensure adequate isolation of the path between the end caps of the fuse. Such caps are illustrated at 13 and each comprises a metallic sleeve having a flared mouth portion 14 fitting upon the ceramic casing 8 and leaving a gap which is filled with a suitable sealing material such as an epoxy resin composition providing a seal between the sleeve 13 and the casing 8, these parts being suitably corrugated if desired.

The sleeve 13 is flanged inwardly to engage a metallic terminal plate 15 which seats against an annular ring 16 supporting a sealing element 17 which presses against the end of the casing 8.

A flanged disc 19, the peripheral part of which fits between the edge of the disc 15 and the ring 16 serves to support a sleeve 20 which provides the carrier for the adjacent end of the star-shaped ceramic core 10. The end of the core 10 seats against a flanged disc or terminal means 21 merging into a tubular auxiliary casing 22 extending inwardly within the star-shaped core 10 and housing an axially movable striker pin 23 which normally lies within a central bore within the end plate 15. The striker pin 23 is screwed at its upper end into a casing 25 containing a charge of explosive powder 26 and a connector wire 27, which may consist of the alloy known as Ferry metal (an alloy of nickel (44% approx.) and copper (55% approx.)), extends into a terminal plug 28 fitting in the casing 22 and then passes through the powder charge 26 and is gripped by the screwed end of the striker pin 23. A spring contact 29 provides electrical continuity between the connecting wire 27 and the casing 22.

Metallic discs 30 surround and grip firmly upon a cylindrical surface part of the striker pin 23 for a purpose which will be apparent from the following description of the operation of the device. The connector wire 27 is carried through an aperture 31 in the star-shaped core 10 and is connected to one of the fuse strips 11, as indicated on FIG. 1 of the drawings.

By appropriate construction of the portion of the fusible element lying between the point of connection of the wire 27 to one of the fusible elements 11, as explained hereinafter, current is diverted into the connecting wire 27 when the maximum full load current of the fuse is substantially exceeded, resulting in the wire 27 firing the powder charge 26 which thus forces the striker pin 23 outwardly to the position shown in chain dot lines in FIG. 1. The discs 30 now engage behind a stepped part of the striker pin 23 and thus prevent the striker pin 23 from being pushed back to its starting position.

The striker pin 23 may serve the purpose of operating a visible or audible warning device to show that the fuse has operated in response to an overcurrent fault, or alternatively, it may be utilised for operating directly or indirectly an isolating switch associated with the current path through the fuse. A typical device is illustrated diagrammatically in FIG. 1 where switch contacts 41 are adapted to be opened by the striker pin and are connected to the no-volt trip circuit of a circuit breaker CB, terminals for connection to the line being shown at 40.

The present invention is particularly directed to a fuse construction where the part of one of the fusible elements 11 lying in the immediate vicinity of one of the end caps 13 is adapted to ensure operation of the trip device indicated generally at 22 on FIGS. 2 to 6 of the drawings to effect the operation of the striker pin 23. This portion of the said fusible element 11 operates at a lower temperature than the remainder of the elements, because of the proximity to the substantial mass of metal represented by the terminal cap structure 13, 15 and its associated parts, and in accordance with the present invention this portion of the fusible strip 11 is shunted by the connector wire 27 leading to the trip device 22 and thence connected to the terminal cap structure represented by the disc 21.

The portion of the strip 11 lying between the point of connection of the wire 17 to the strip 11 and the terminal disc 21 is modified in one or other of the ways to be described to ensure preferential fusing under overcurrent fault conditions. Such modification includes a local restriction in the cross-section of the strip 11. As shown in FIG. 2, a portion of relatively low melting point metal 35 is associated with an aperture in a fuse strip 11 adjacent to the terminal disc 21. This element 35 may for example consist of a tin rivet inserted through the aperture in the fuse strip 11 which may conveniently be a silver strip and clenched into intimate contact with the fuses of the strip.

The parts are so designed that up to full load rating the tin element 35 does not melt or become incorporated into or alloyed with the fuse strip 11, but on exceeding the full load rating for a predetermined period the tin element or rivet 35 will alloy with the silver of the strip 11, the resulting alloy having such properties that the fuse element 11 melts and the fault current is diverted at least in part into the trip device 22 via the wire 17 and thereby the tip of the striker pin 23 is forced outwardly of the end cap 15 to provide an audible or visual warning or to actuate an isolating switch as already described, for example by opening the contacts 41.

This action may be promoted as shown in FIG. 3 by additionally providing a further aperture 37 in the fuse strip 11 and at a point adjacent to the low melting point metal 35 but at a point more distant from the end disc 21, as illustrated. This arrangement promotes rapid interruption of the current path through the fusible element 11.

According to a further arrangement illustrated on FIG. 4, the operation of the trip device 22 may be further promoted in some cases by arranging that the portion of the strip 11 lying between the point of connection of the wire 17 and the terminal disc 21, is of reduced cross-sectional dimensions, as indicated at 111. In this case again an element 35 of low melting point metal such as tin, is shown, and it is also possible to provide the aperture 37 as shown in FIG. 3.

FIG. 5 hereinafter referred to also shows an arrangement in which the element 11 is of reduced cross-sectional size at 111 and is also provided with a low melting point metal 35, but no second aperture 37 is provided in this case.

The various arrangements shown on FIGS. 2 to 5 may be selected according to particular requirements and depending on the operating properties of the fuse to which the trip device of the present invention is applied.

FIGS. 2, 3 and 4 and the lower section of FIG. 5 illustrate the arrangement of the part of the fusible element across which the striker device 22, 23 is connected, and it should be understood that these arrangements are applicable to various types of fuses embodying various arrangements of fusible elements where a plurality of fusible elements are connected in parallel, the trip or striker device 22, 23 being connected to one only of said elements.

FIG. 1 illustrates the case where the fusible elements 11 are provided with arc control ceramic beads 12 at predetermined spaced points on each fusible strip. FIGS. 5 and 6 illustrate the application of the invention to fusible elements of the character described in U.S. Patent No. 3,138,682.

These fusible elements are specifically designed to provide restriction of the maximum arc voltage rise during clearance of heavy fault current or short-circuit currents such as is required for fuses intended for protecting power current semi-conductor devices such as germanium and silicon power rectifiers. As described in the aforesaid patent a fusible strip 11 embodies spaced ceramic elements or beads 12 and at least two portions 112 of graded cross-sectional area and at least one portion 113 of uniform cross-sectional area lying between the portions 112 and carrying a ceramic element 12. If desired, and as indicated, a portion 38 of low melting point metal may be placed in physical contact with the strip 11 at a suitable position of the graded cross-sectional area portions 112, all these features co-operating to produce the required operating properties of the fuse under heavy current or short-circuit fault conditions, that is to ensure that the maximum arc voltage rise does not greatly exceed the normal operating voltage.

It should be understood that the function of the low melting point metal portion 38 which is disposed at the portion of the fusible element which is at a relatively high temperature under operating conditions, is entirely different from the portion of low melting point metal 35 which co-operates to produce operation of the trip device 22, 23 at overcurrent values lying between the full load rating and the minimum fusing current, since the element 35 is in a zone where substantial cooling is obtained by conduction from the terminal end cap structures and is arranged so that alloying occurs with the metal of the fuse strip on all values of current exceeding the full load rating, whereas the portion 38 is designed and proportioned so as to ensure initiation of the fuse action under heavy overcurrent or short-circuit fault conditions while the ceramic beads 12 provide a multiple interruption of the arc path under these heavy current fault conditions.

Heretofore the invention has been described as applied to fusible strips 11, but the invention may equally be applied to fuse structures embodying fusible wires of circular or similar cross-section. An arrangement of this character is indicated on FIG. 6 of the drawings in the case of a fusible element intended to operate in the same way as that shown in FIG. 6 and likewise provided with ceramic beads 12, graded portions 112 and uniform area portions 113, the graded portion 112 being also provided with a portion of low melting point metal 38. In this case the terminal end portion of the fuse wire 115 is flattened as shown at 116, for example by rolling, and this flattened portion may be arranged as shown in any of FIGS. 2 to 5. As specifically shown, the flattened portion is provided with a portion 35 of low melting point metal and is shunted by the connector wire 17 leading to the trip device 22, 23.

In all the embodiments of the invention the fusible element 35 preferably comprises a tin rivet which is passed through an aperture formed in the strip adjacent to the terminal disc 21; the insertion of the rivet 35 ensures a concentration of the fault current in the conductive portions on the two sides of the rivet. The use of a rivet at this position is important as it ensures that oxidation of the contact surfaces between the low melting point element 35 and the part of the strip against which it seats is avoided under normal operating conditions, and ensures uniform electrical and heat conductivity between the metal of the strip and the low melting point metal 35. This use of a rivet passed through an aperture in the strip cooperates in ensuring correct operation of the trip device 22, 23 under relatively low values of overcurrent.

FIG. 7 is a graph illustrating the operation of a typical fuse according to the present invention rated at 20 amps, in which the operating time in seconds is shown on the vertical scale and the current in amps on the horizontal scale, both scales being shown as log scales. The solid line shows that, for example, a fault current of 60 amps will provide fault clearance and interruption of the current with a time delay of approximately 80 secs., whereas a current of 50 amps will not result in interruption of the current. The chain-dotted line continuation curve indicates the operation of the trip device according to the present invention, in typical form, and shows that the same current of 50 amps will provide operation of the trip device in about 600 secs., and that any fault current in excess of 36 amps will provide for operation of the trip device. The chain dotted extension curve shows how the features of the present invention provide for coverage of the gap between the minimum interruption current which is a little below 60 amps in the typical example shown on the drawings, and a lower current value approaching that of the minimum fusing current. Over the range represented by the chain dotted curve interruption and circuit protection is obtained either by operation of a suitable isolating switch or by intervention of an attendant after the warning signal has been given on operation of the striker pin.

What I claim is:

1. In a high voltage powder filled electric fuse for limiting electric current having an outer casing, terminal end caps closing the ends of said outer casing, and a plurality of fusible elements for interconnecting said end caps, the improvement of a trip device comprising an auxiliary casing fitted at one end of said outer casing, terminal means for mounting said auxiliary casing on one of said end caps, at least one of said fusible elements being connected to said terminal means, a striker pin housed within said auxiliary casing, a charge of gas-producing material within said auxiliary casing for actuating said striker pin, an actuating wire in contact with said gas-producing material, said wire being connected to a shunted part of the length of said one of said fusible elements between an intermediate point and said terminal means, and a portion of low melting point metal fixed to said shunted part of said one fusible element to effect alloying for interruption of the electrical current through said shunted part of said one fusible element under overcurrent conditions whereby to divert electric current through said actuating wire to activate said charge of gas-producing material so as to actuate said striker pin, said metal portion being at a point in heat transferring relation to said terminal means so that heat is absorbed from said metal portion to prevent premature interruption of the current through said shunted part.

2. The combination of claim 1 wherein is further provided a sleeve for spacing said terminal means inwardly from said one end cap.

3. The combination of claim 1 wherein said shunted part further includes an aperture and wherein said portion of low melting point metal extends through said aperture and is clenched into close contact with the flat faces of said shunted part of said one fusible element.

4. The combination of claim 3 wherein is further provided a second aperture to promote interruption of the current path along said shunted part, said second aperture being placed between said portion of low melting metal and said intermediate point of said fusible element to which said actuating wire is attached.

References Cited by the Examiner

UNITED STATES PATENTS

| | | | |
|---|---|---|---|
| 2,592,399 | 4/1952 | Edsall et al. | 200—120 |
| 2,800,554 | 7/1957 | Dannenburg et al. | 200—120 |
| 3,012,121 | 12/1961 | Hicks | 200—120 |
| 3,110,855 | 11/1963 | Chumakov | 200—120 |
| 3,113,193 | 12/1963 | Jacobs. | |
| 3,138,682 | 6/1964 | Dannenburg et al. | 200—120 |

FOREIGN PATENTS 788,208   12/1957   Great Britain.

BERNARD A. GILHEANY, *Primary Examiner.*

H. B. GILSON, *Assistant Examiner.*